United States Patent [19]

Suda

[11] Patent Number: 4,996,612
[45] Date of Patent: Feb. 26, 1991

[54] CASSETTE LOADING APPARATUS HAVING OPTIMUM ERROR PROTECTION DEVICE

[75] Inventor: Kenichi Suda, Fukaya, Japan

[73] Assignee: Kabushiki Kaisha Toshiba, Kawasaki, Japan

[21] Appl. No.: 457,959

[22] Filed: Dec. 27, 1989

[30] Foreign Application Priority Data

Dec. 28, 1988 [JP] Japan .................. 63-333606

[51] Int. Cl.$^5$ .......................................... G11B 5/008
[52] U.S. Cl. .............................................. 360/96.5
[58] Field of Search ...................... 360/96.5, 99.07; 242/197–199

[56] References Cited

U.S. PATENT DOCUMENTS 4,319,292  3/1982  Katoh ........................ 360/96.5
4,768,113  8/1988  Sato ........................... 360/96.5

Primary Examiner—A. J. Heinz
Attorney, Agent, or Firm—Cushman, Darby & Cushman

[57] ABSTRACT

A cassette holder houses a cassette to be loaded and is arranged to be movable along a substantially horizontal moving path. A cassette detecting member is arranged on the cassette holder and is set at an operative position and a nonoperative position in accordance with the presence/absence of the cassette. A loading mechanism selectively drives the cassette holder so as to load the cassette from an insertion position to a driving position and to unload the cassette from the driving position to an ejecting position. A plurality of lock members are arranged on the moving path of the cassette holder at predetermined intervals so as to lock the cassette detecting member by using one of the lock members when the cassette detecting member is set at the nonoperative position. A control portion allows the loading mechanism to perform loading in response to insertion of the cassette, allowing the loading mechanism to perform unloading in response to an ejecting operation, and switching a loading operation of the loading mechanism to an unloading operation when one of the plurality of lock members locks the cassette detecting member during execution of loading by the loading mechanism.

3 Claims, 17 Drawing Sheets

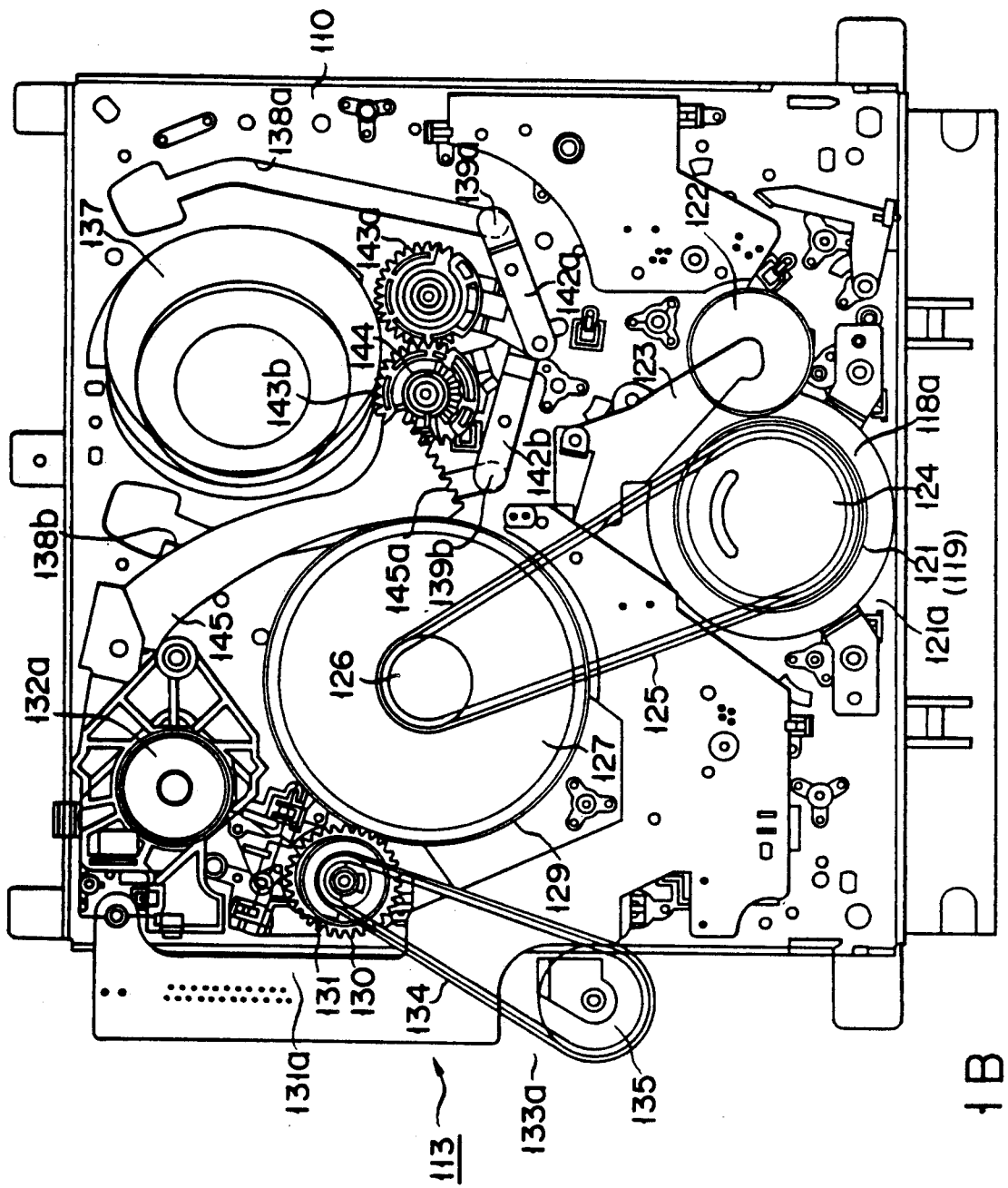

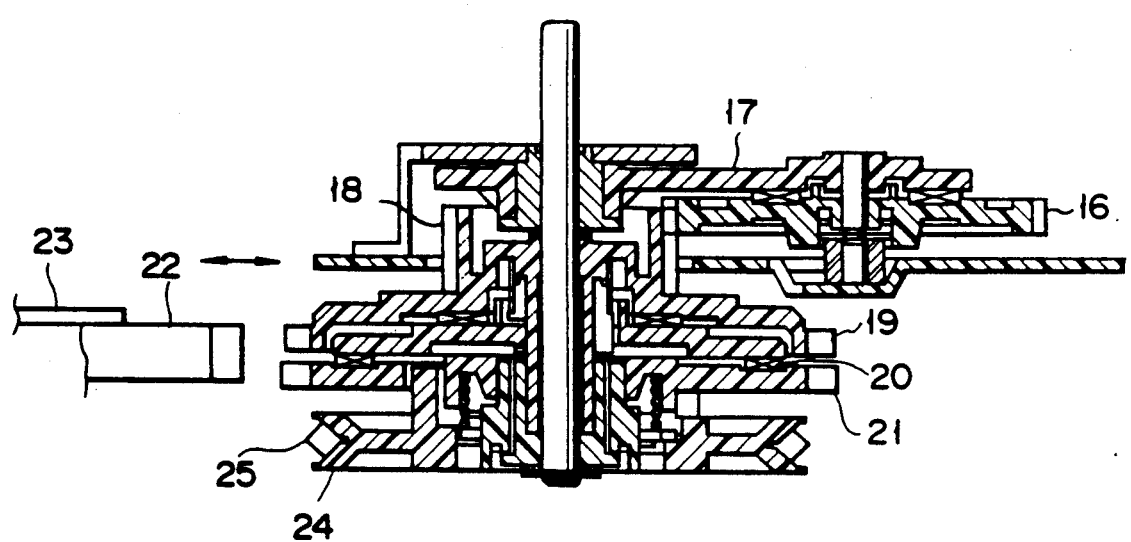
F I G. 2

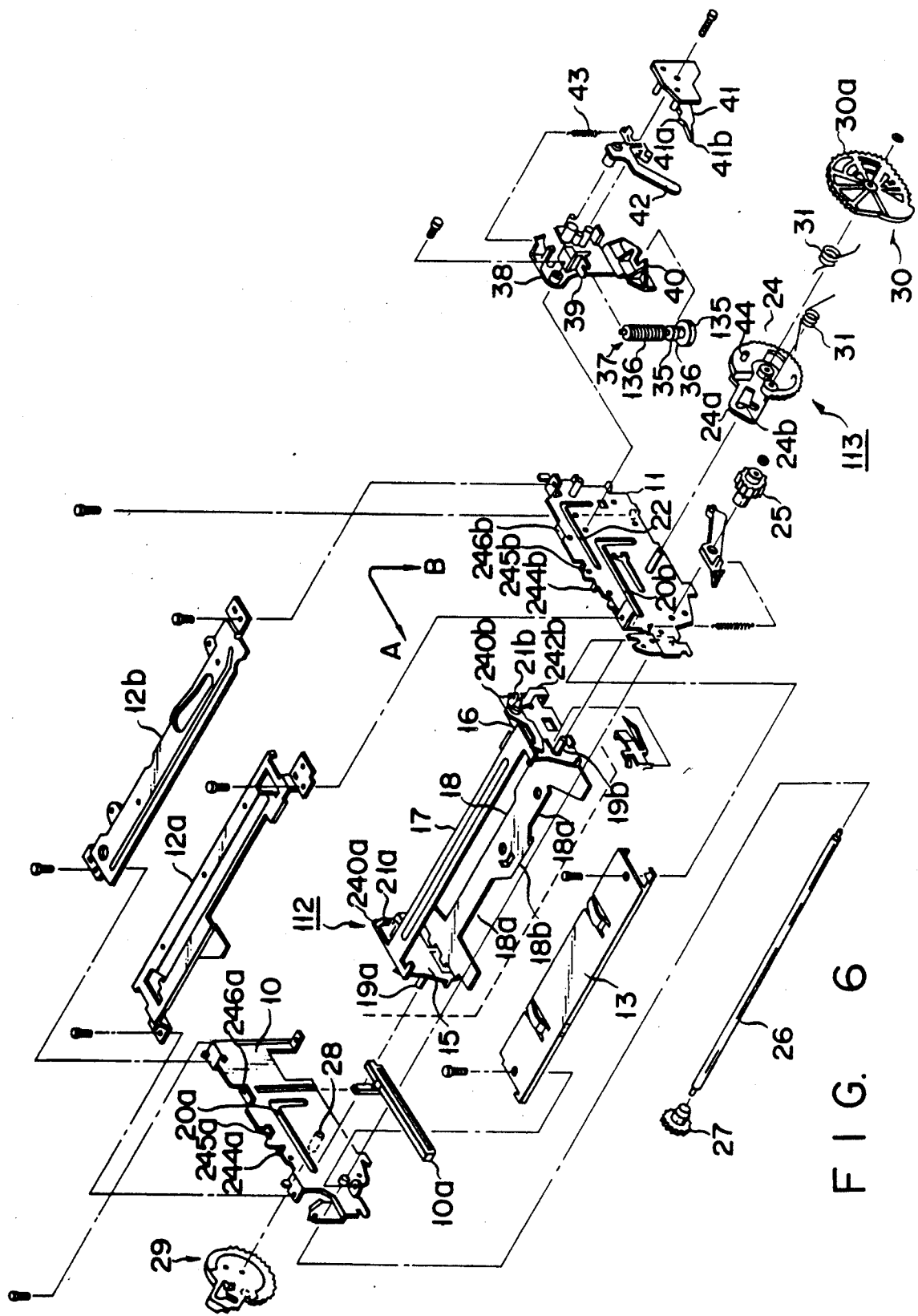
F I G. 6

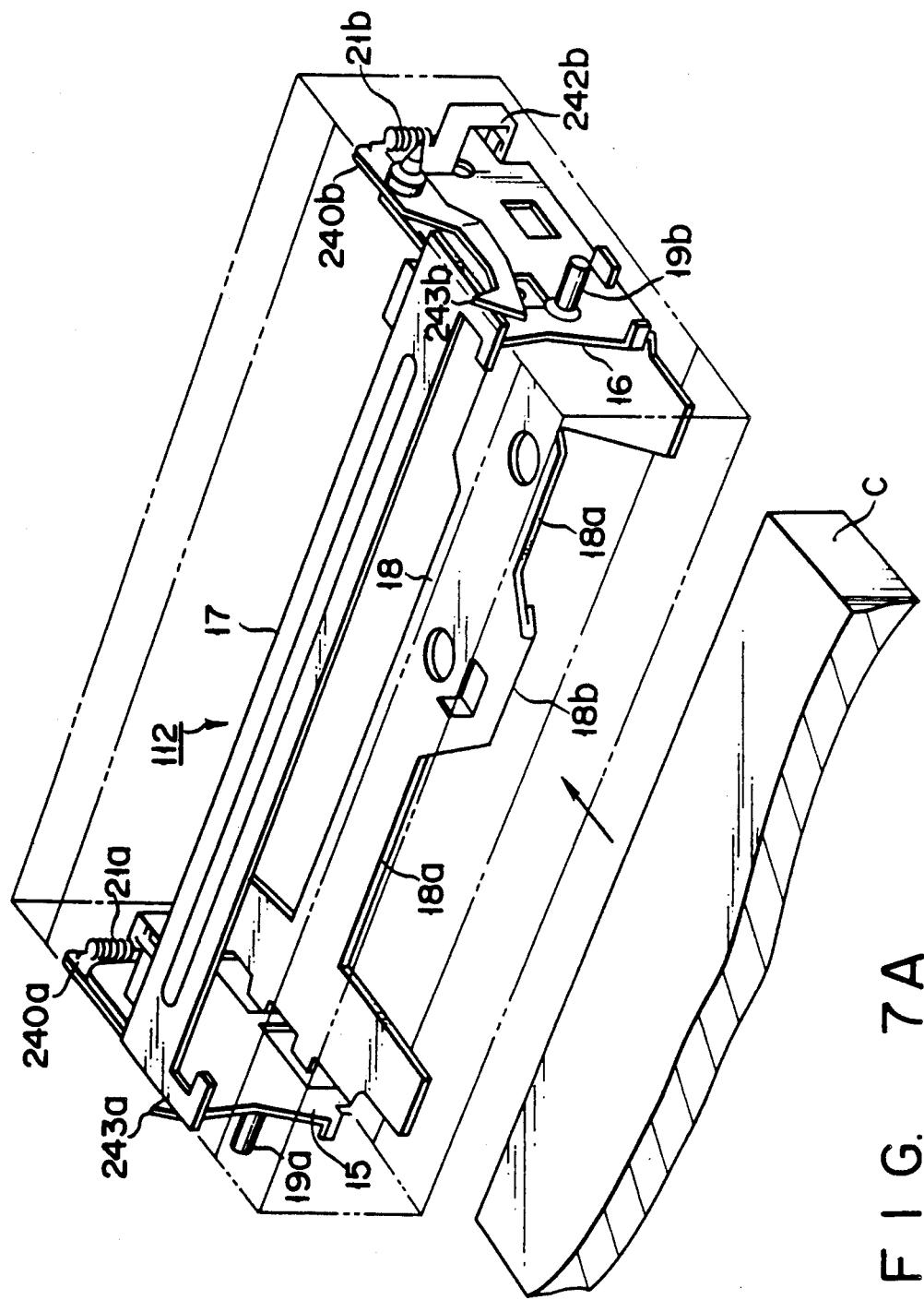

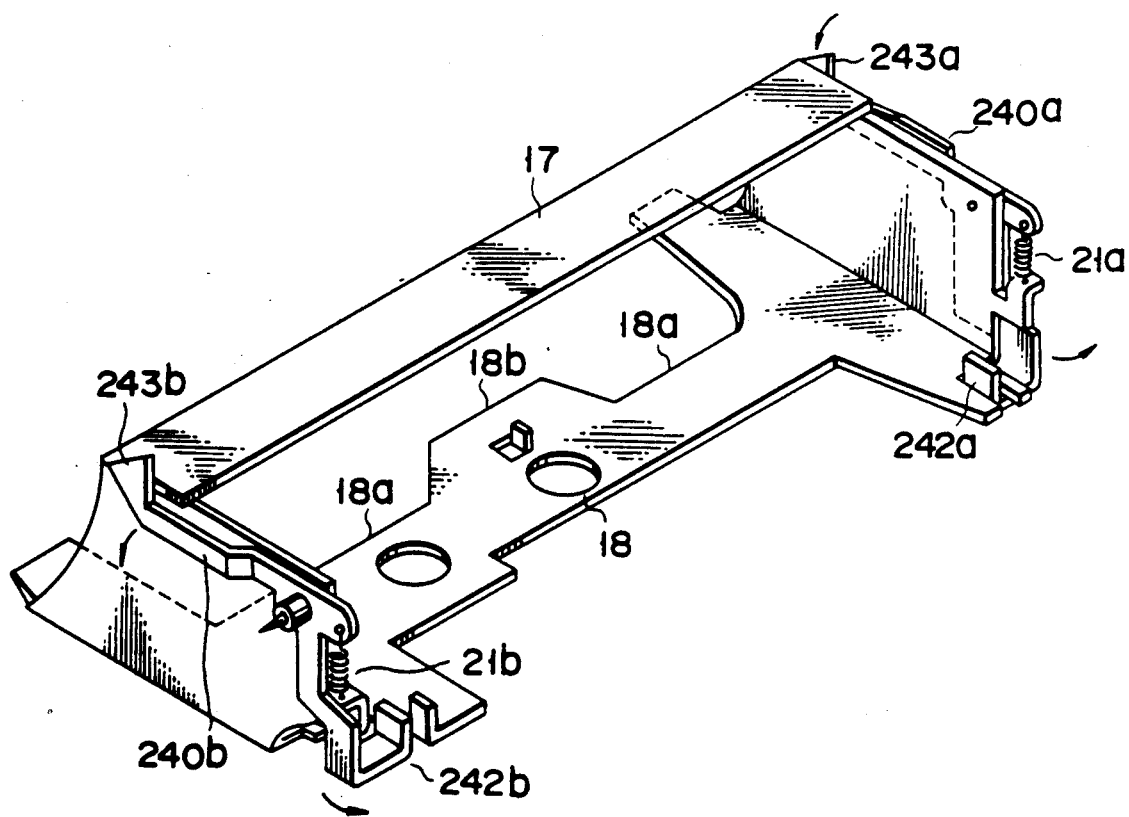
F I G. 7B

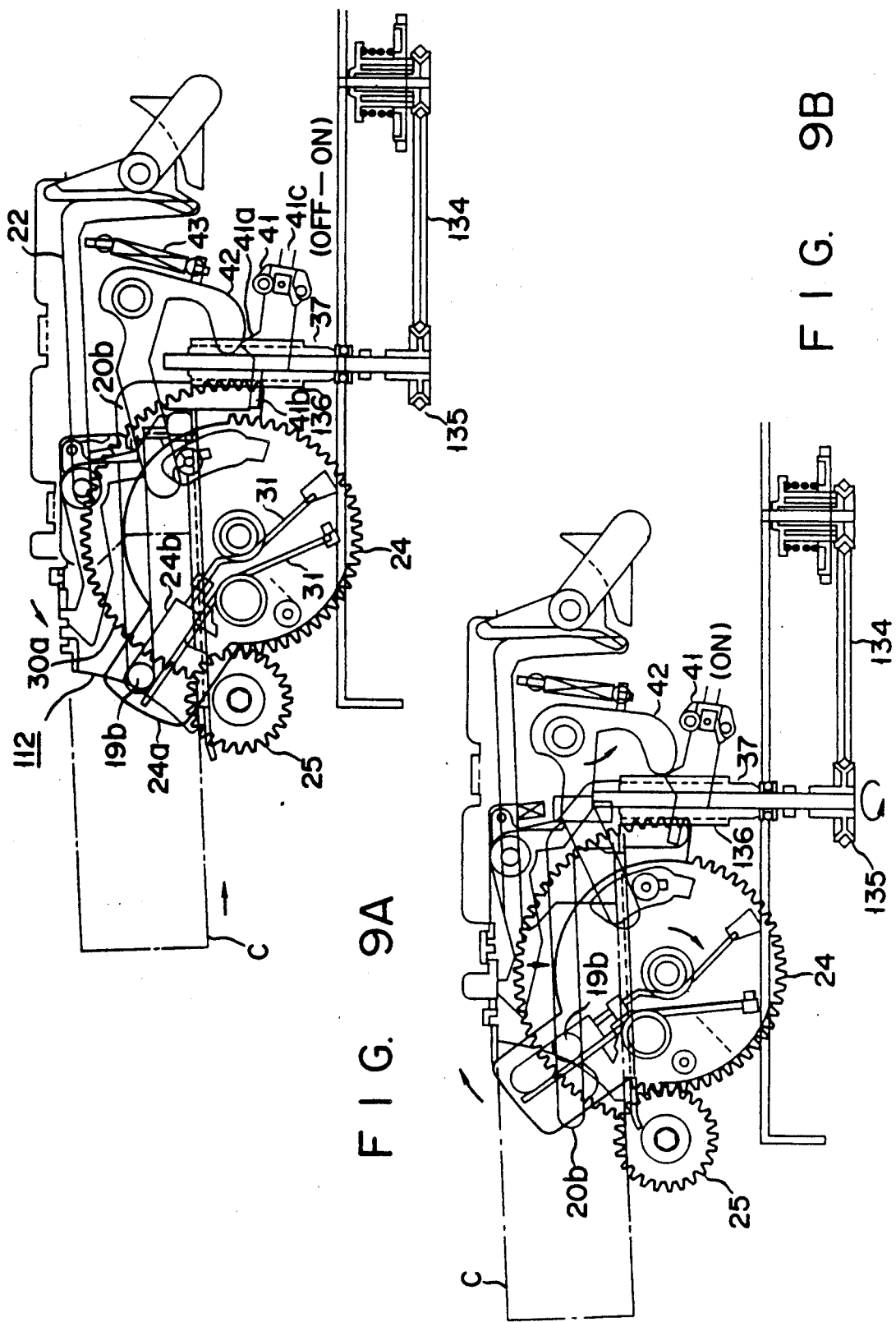

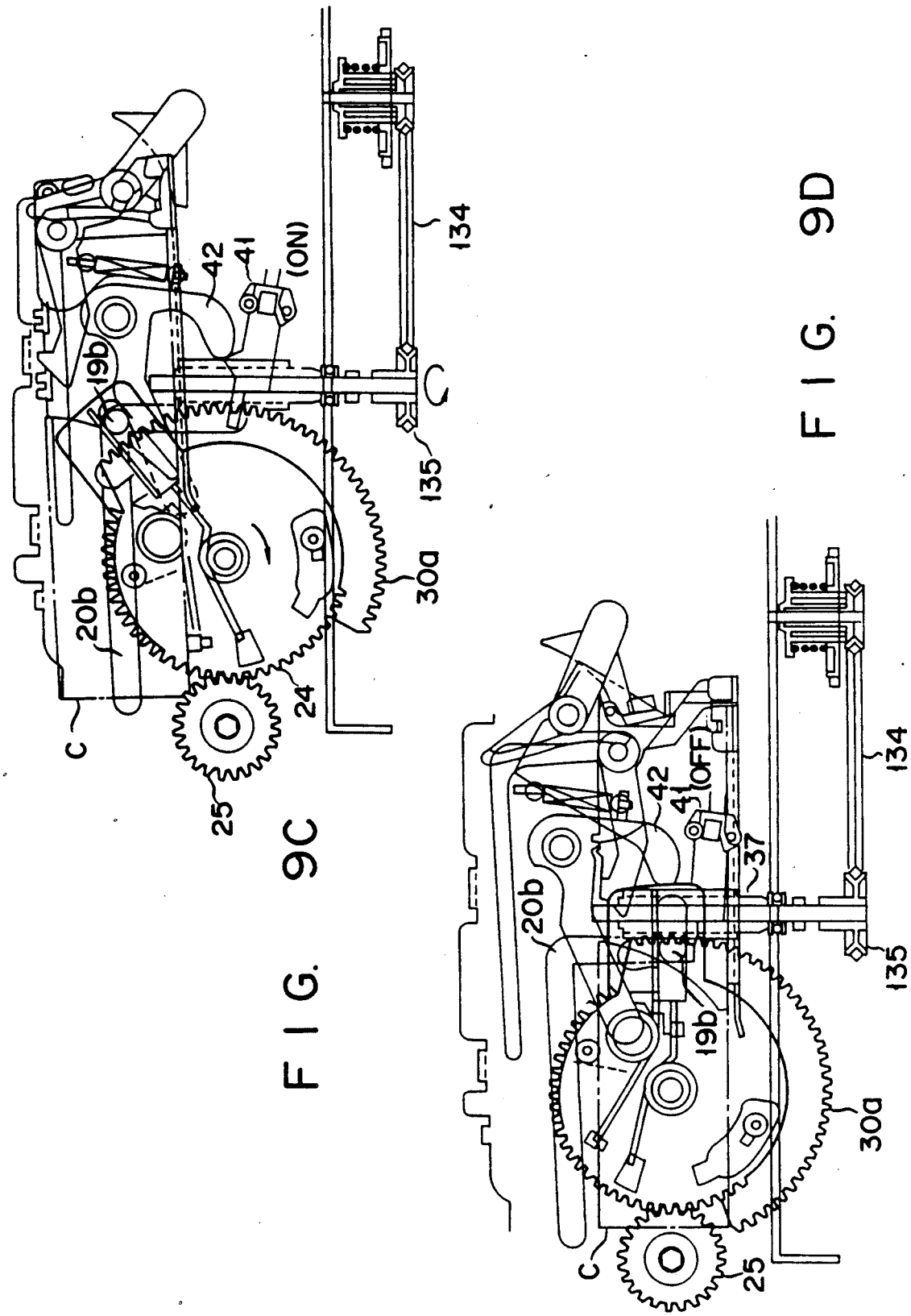

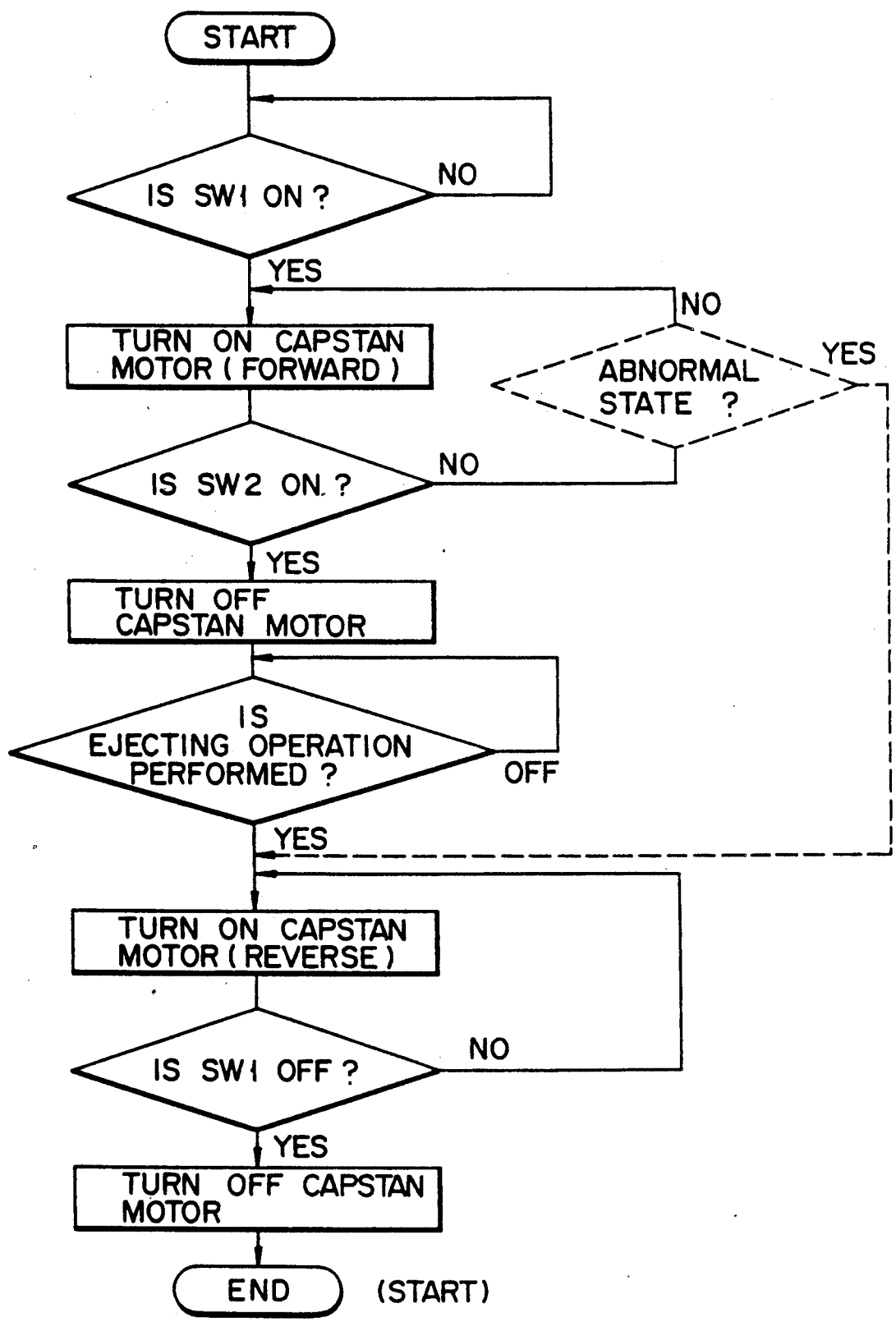
F I G. 14

CASSETTE LOADING APPARATUS HAVING OPTIMUM ERROR PROTECTION DEVICE

BACKGROUND OF THE INVENTION

1. Field of the Invention

The present invention generally relates to a cassette loading apparatus and, more particularly, to a cassette loading apparatus, used for a magnetic recording/reproducing apparatus such as a video tape recorder (to be referred to as a VTR hereinafter), for driving a tape cassette in a substantially horizontal state and loading it to a tape driving portion.

2. Description of the Related Art

A cassette loading apparatus used for a recent VTR is generally designed such that when a tape cassette is inserted in the cassette holder in a substantially horizontal state, the front loading mechanism is operated to move the cassette holder to a position above the tape driving portion, and the tape cassette, which is lowered and held, is loaded to the tape driving portion. In this case, the cassette cover of the tape cassette is opened, and the tape extract members of the tape loading mechanism are moved inside the tape. In this state, the tape loading mechanism is driven to perform tape loading.

In ejection of the tape cassette, an unloading operation is performed to move the cassette out of the cassette holder by performing a reverse operation to the above-described loading operation.

Such a cassette loading apparatus is inevitably required to ensure high-precision operation control and to simplify manufacturing/assembly steps with a simple arrangement.

An error protection device is a device which can realize the above-described cassette loading apparatus. When a tape cassette is inserted in the cassette holder but the inserted tape cassette is removed by a user at substantially the same time that loading is started, the error protection device detects this removal of the tape cassette, and restores the cassette holder to the original tape insertion position. More specifically, this error protection device includes a detecting means which is arranged at a predetermined position on the moving path of the cassette holder so as to detect whether a cassette detecting member formed on the cassette holder is operated or not. The error detection device controls a reverse operation of the front loading mechanism in response to detection of the detecting means so as to restore the cassette holder to the cassette insertion position in the course of loading.

In the conventional error protection device, however, the following problem has been posed due to its arrangement. Once a loading operation is started, it takes a considerably long period of time to perform slot-out by reversing the front loading mechanism so as to restore the cassette holder to the original cassette insertion position upon detection of the absence of a tape cassette. This causes a user to perform an erroneous operation or the like in the course of an error protection operation.

As described above, in the conventional cassette loading apparatus, when a tape cassette is removed after loading of the cassette holder is started, a user tends to cause an operation error or the like because ejection of the cassette holder takes an excessively long period of time.

SUMMARY OF THE INVENTION

It is, therefore, an object of the present invention to provide a new and improved tape loading apparatus having an optimum error protection device in which an operation error caused by a user is prevented by realizing reliable, quick operation control of a cassette holder, thereby improving operability.

According to the present invention, there is provided a cassette loading apparatus comprising:
- a cassette holder which houses a cassette to be loaded and is arranged to be movable along a substantially horizontal moving path;
- cassette detecting means which is arranged on the cassette holder and is set at an operative position and a nonoperative position in accordance with the presence/absence of the cassette;
- loading means for selectively driving the cassette holder so as to load the cassette from an insertion position to a driving position and to unload the cassette from the driving position to an ejecting position;
- a plurality of lock means, arranged on the moving path of the cassette holder at predetermined intervals, for locking the cassette detecting means by using one of the lock means when the cassette detecting means is set at the nonoperative position; and
- control means for allowing the loading means to perform loading in response to insertion of the cassette, allowing the loading means to perform unloading in response to an ejecting operation, and switching a loading operation of the loading means to an unloading operation when one of the plurality of lock means locks the cassette detecting means during execution of loading by the loading means.

According to the above-described arrangement, if a cassette is not inserted in the cassette holder at the insertion position, the cassette detecting means is set at the nonoperative position. As a result, the cassette detecting means is locked by one of the lock means so as to stop loading. If a cassette is removed from the cassette holder after the cassette is inserted and loading is started, the cassette detecting means is selectively locked by one of the lock means, which is located nearest to the cassette detecting means, during loading. Upon this lock operation, the loading operation of the loading means is switched to an unloading operation by the control means, thereby moving the cassette holder to the ejecting position. Therefore, even if an inserted cassette is removed, since the presence/absence cf the cassette is selectively detected in accordance with a timing of removal after loading, a quick ejecting operation to the ejecting position can be realized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 1A to 1C are top, bottom, and side views, respectively, of a VTR to which a cassette loading apparatus according to an embodiment of the present invention is applied;

FIG. 2 is a sectional view showing of a clutch gear mechanism of FIG. 1B in detail;

FIG. 6 is an exploded perspective view showing a main part of the present invention;

FIGS. 7A and 7B are perspective front view and a perspective back view showing an assembled state of a cassette holder in FIG. 6, respectively;

FIGS. 9A to 9D and FIGS. 10A and 10B are views showing an operation sequence of a cassette loading mechanism;

FIG. 14 is a flow chart for explaining an operation of the circuit in FIG. 13.

DETAILED DESCRIPTION OF THE PREFERRED EMBODIMENT

An embodiment of the present invention will be described in detail below with reference to the accompanying drawings.

Figure 1A:
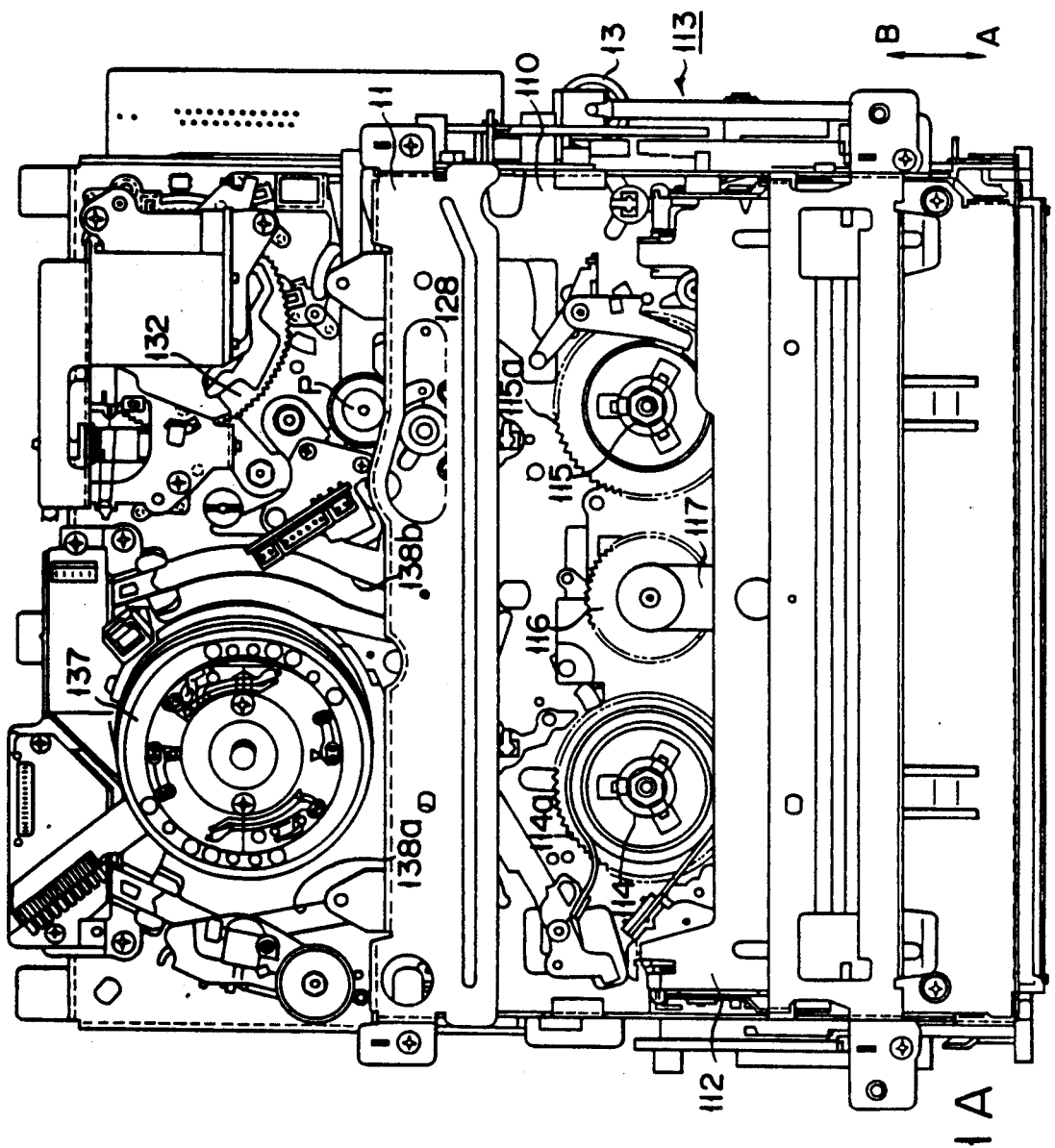
Figure 1C:
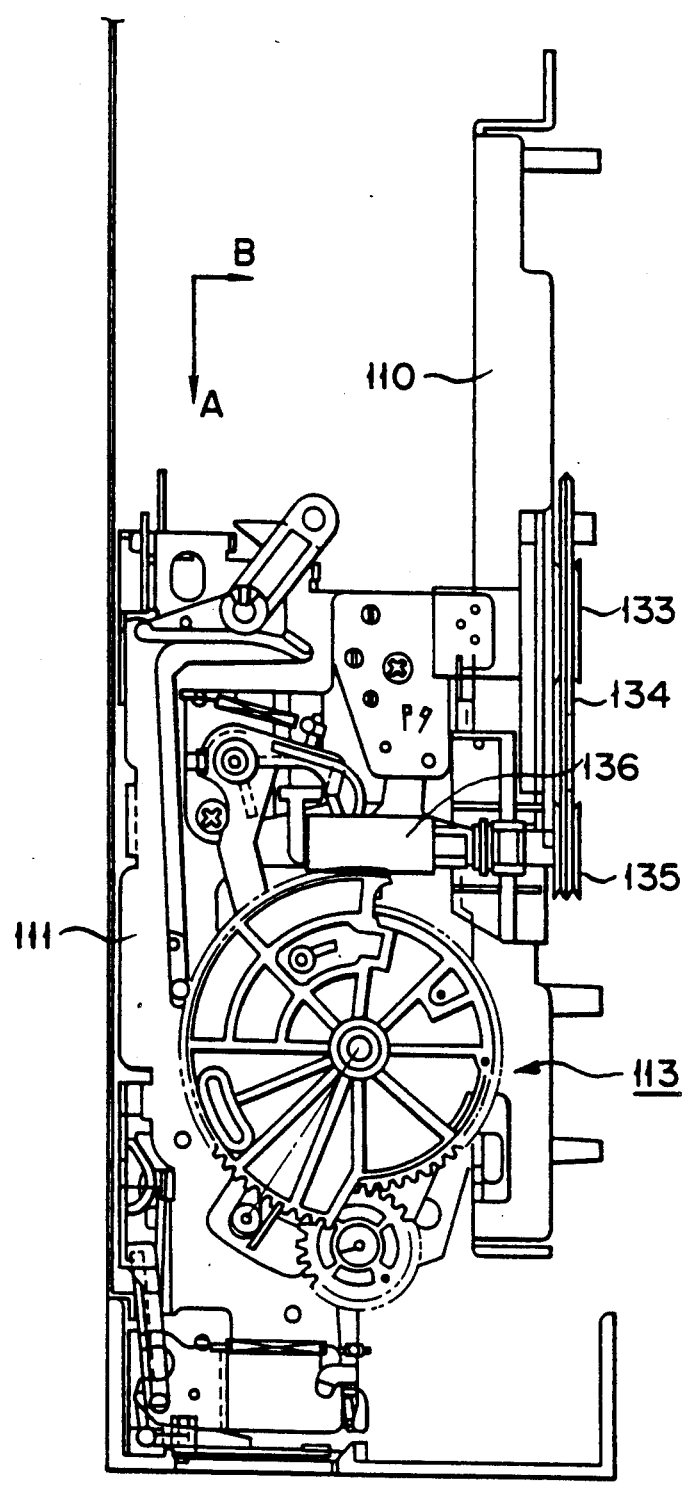

FIGS. 1A to 1C show a VTR to which an embodiment of the present invention is applied. FIGS. 1A, 1B, and 1C are respectively top, bottom, and side views of the VTR. Referring to FIGS. 1A to 1C, reference numeral 110 denotes a main chassis. A frame 111 is arranged at one end of the main chassis 110. A cassette holder 112 is supported on the frame 111 so as to be movable in directions indicated by arrows A and B. A tape cassette C (not shown in FIGS. 1A to 1C; see FIG. 4) is inserted in the cassette holder 112 when the holder 112 is set at a cassette insertion position which is the farthest position in the direction indicated by the arrow A. Upon this insertion operation, a front loading mechanism 113 as a cassette loading apparatus (to be described later) which constitutes a main feature of the present invention is driven and moved in the direction indicated by the arrow B so as to load the tape cassette C to reel hubs 114 and 15 on the tape feed side and tape take-up side of a tape driving portion.

Gears 114a and 115a are respectively arranged on the reel hubs 114 and 115, and a drive gear 116 constituting a tape driving mechanism is arranged between these gears 114a and 115a. The drive gear 116 is supported on one end of a swing member 117. As shown in FIG. 2, a gear 118 is attached to the other end of the swing member 117, and the gear 118 is meshed with the drive gear 116. The gear 118 is coaxially arranged with a first gear 119 of a clutch gear mechanism 118a. The first gear 119 is stacked on a second gear 121 through a friction member 120. A clutch switching gear 122 is opposed to the first and second gears 119 and 121 so as to be freely brought into contact therewith and separated therefrom. The gear 122 is pivotally mounted through a switching lever 123 which is interlocked with an operation mode switching mechanism, and is selectively meshed with the first and second gears 119 and 121, in response to the operation mode. A pulley 124 which constitutes a tape driving belt transmission mechanism 121a is coaxially arranged with the second gear 121. One end of a drive belt 125 is looped around the pulley 124, and the other end of the belt 125 is looped around a drive pulley 126 (see FIG. 1B). The drive pulley 126 is fitted on the rotating shaft of a driving capstan motor 127. A capstan 128 is coaxially mounted on the capstan motor 127. The driving force of the motor 127 is transmitted to the pulley 124 through the drive belt 125. As a result, the pulley 124 drives one of the gears 114a and 115a of the reel hubs 114 and 115 through the gear 122, the first gear 119, the gear 118, the swing member 117, and the drive gear 116. The tape is driven while being clamped between the capstan 128 and a pinch roller P.

Figure 3:
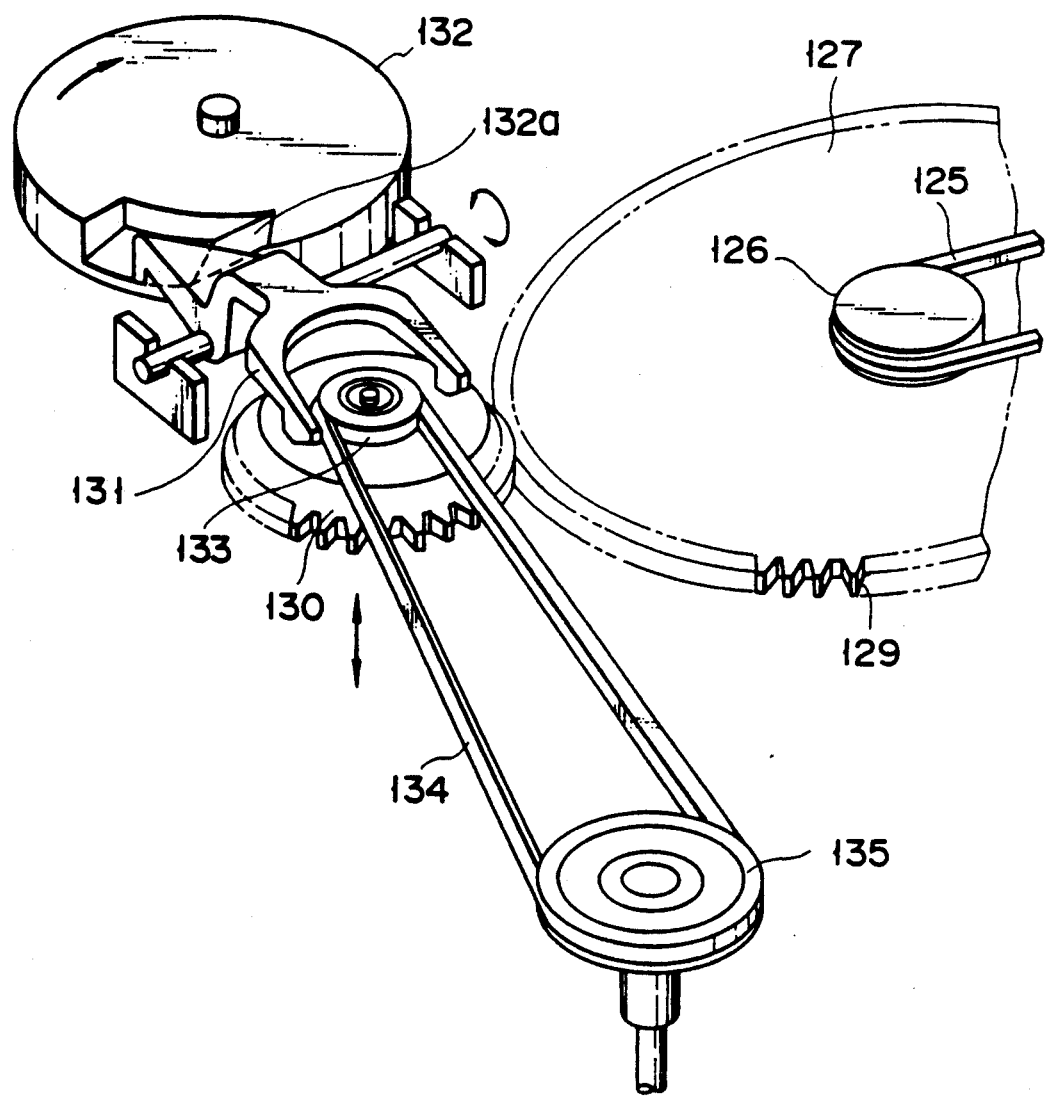
FIG. 3 is a perspective view showing a detailed arrangement of a mode switching mechanism and a belt transmission mechanism portion.

A drive gear 129 is fitted around a rotating body of the capstan motor 127. A lifting gear 130 is opposed to the drive gear 129. The lifting gear 130 is arranged to be freely moved, through a spring mechanism (not shown), in the axial direction with respect to the main chassis 110. One end of a pivotal switching lever 131 is engaged with the upper surface of the lifting gear 130 (see FIG. 3). The other end of the switching lever 131 is engaged with a first cam portion formed on one surface of a mode switching cam 132 of an operation mode switching mechanism 131a. The pivotal movement of the switching lever 131 is controlled through the mode switching cam 132 in such a manner that one end of the switching lever 131 is separated from the lifting gear 130 in a cassette loading state so as to cause the lifting gear 130 to move upward through the spring mechanism (not shown) and to be meshed with the drive gear 129, and, in a state in which cassette loading is completed, one end of the switching lever 131 causes the lifting gear 130 to move downward against the biasing force of the spring mechanism (not shown) to be separated from the drive gear 129. In addition, a pulley 133 is coaxially arranged on the lifting gear 130. One end of a drive belt 134 which constitutes a cassette loading belt transmission mechanism 133a is looped around the pulley 133. The other end of the drive belt 134 is looped around a pulley 135. The pulley 135 is coaxially arranged with a worm 136 (see FIG. 1A) of the loading mechanism 113. The rotational force of the capstan motor 127 is selectively transmitted to the pulley 133, the drive belt 134, the pulley 135, and the worm 136 in accordance with the vertical movement of the lifting gear 130, thereby controlling the driving operation of the loading mechanism 113 and moving of the cassette holder 112 in the above-described manner.

Figure 4:
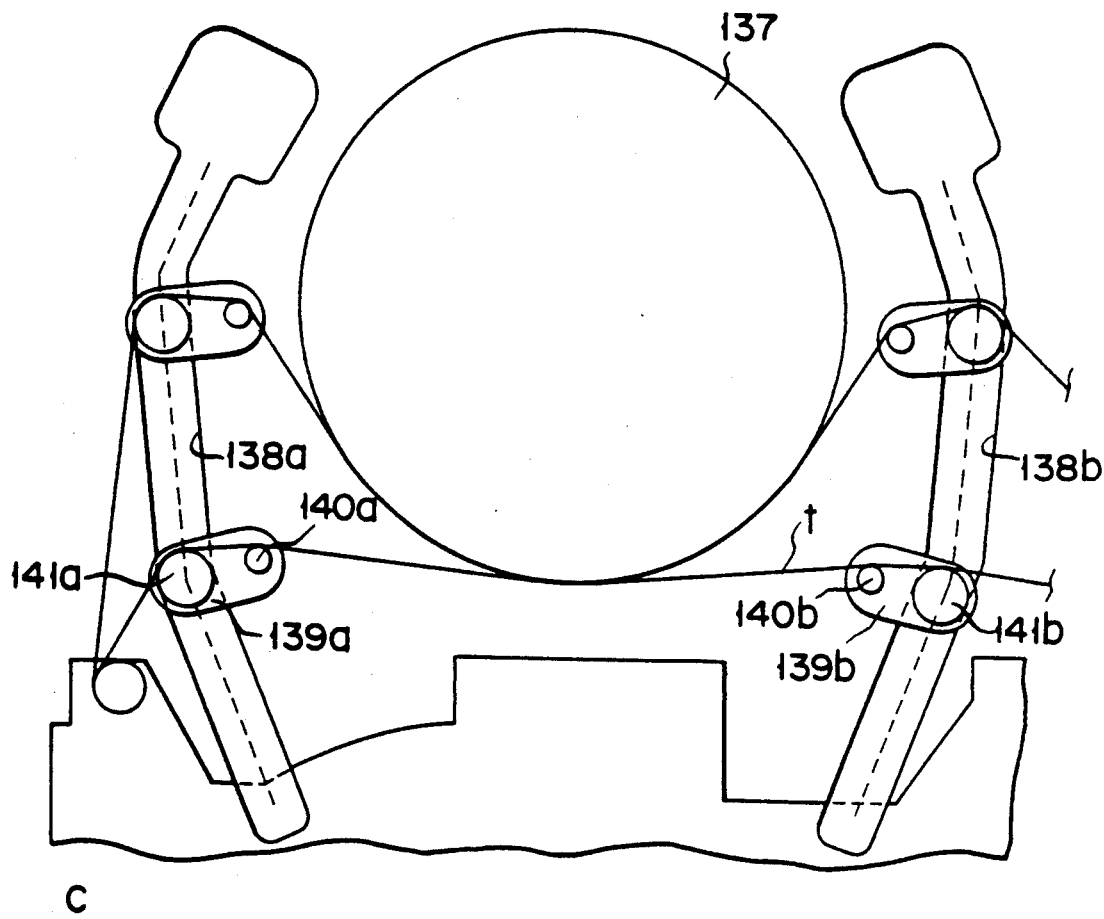
FIGS. 4 and 5 are perspective views respectively showing a tape loading state and a link mechanism, in detail, with respect to a cylinder shown in FIGS. 1A and 1B.
Figure 5:
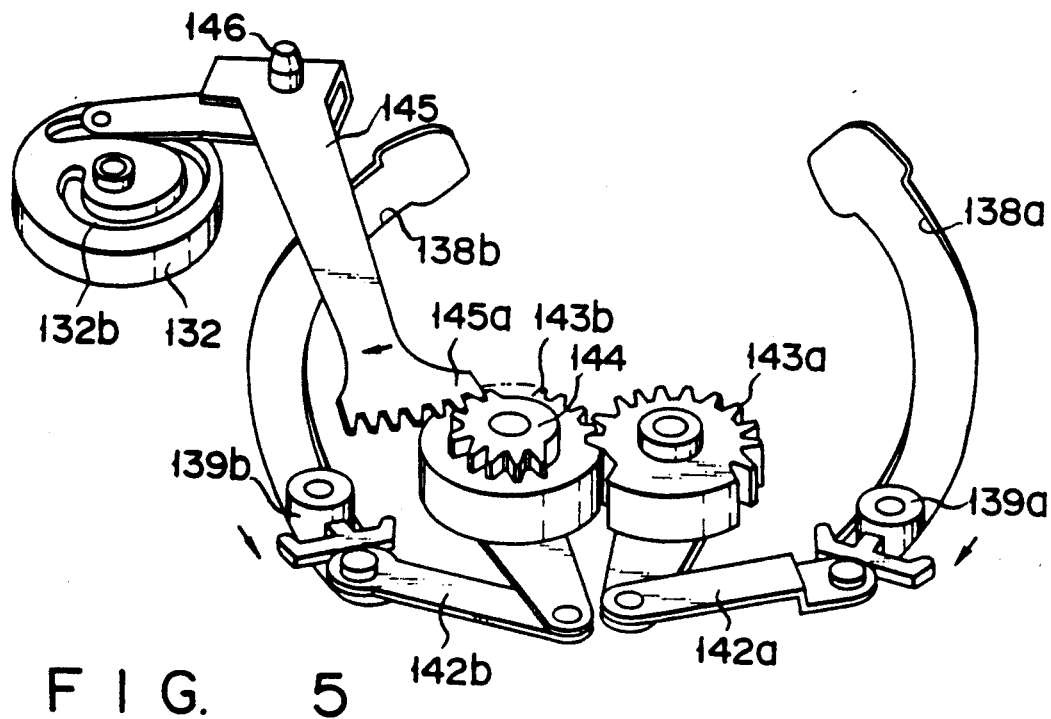

A helical scan type cylinder 137 on which magnetic heads are mounted is arranged on the main chassis 110 so as to correspond to the frame 111. First and second guide grooves 138a and 138b are formed around the cylinder 137 on the main chassis 110 so as to oppose the tape inlet and outlet sides, respectively. As shown in FIG. 4, first and second tape extract members 139a and 139b are movably housed in the first and second guide grooves 138a and 138b. Inclined posts 140a and 140b which are substantially parallel to the cylinder substantially perpendicular to the main chassis 110 are respectively mounted on the first and second tape extract members 139a and 139b so as to be abreast with each other. One end of each of first and second link mechanisms 142a and 142b is coupled to a corresponding base portion of the first and second tape extract members 139a and 139b, as shown in FIG. 5. The other end of each of the first and second link mechanisms 142a and 142b is supported by a corresponding one of first and second drive gears 143a and 143b which are meshed with each other. A notched gear 144 is coaxially arranged on the second drive gear 143b. A fan-like gear 145a which is formed on one end of a drive lever 145 is meshed with the notched gear 144. The intermediate portion of the drive lever 145 is pivotally supported on the main chassis 110 through a pivot shaft 146, and the other end thereof is engaged with a second cam surface 132b of the mode switching cam 132. Therefore, the drive lever 145 is driven upon interlocking with the mode switching cam 132 so as to drive the first and second tape extract members 139a and 139b through the notched gear 144, the first and second drive gears 143a and 143b, and the first and second link mechanisms 142a and 142b, thereby performing tape loading.

A main part of a cassette loading apparatus of the present invention which is applied to the above-described VTR will be described below.

FIG. 6 is an exploded perspective view showing the cassette loading apparatus detached from the VT shown in FIGS. 1A to 1C. Referring to FIG. 6, reference numerals 10 and 11 respectively denote first and second support plates constituting a support member. The first and second support plates 10 and 11 are assembled through upper coupling plates 12a and 12b and a lower coupling plate 13 serving also as a cassette guide in the form of a box. For example, an entrance cover (not shown) is pivotally arranged on the cassette loading/unloading side of the support member. The above-described cassette holder 112 is arranged between the first and second support plates 10 and 11 so as to be freely moved in directions indicated by arrows A and B in a substantially horizontal state.

Guides 10a (only one of them is shown) on which the cassette holder 112 is mounted are attached to the lower portions of the first and second support plates 10 and 11, respectively.

As shown in FIGS. 7A and 7B, the cassette holder 112 is designed such that first and second side plates 15 and 16 are assembled through upper and lower plates 17 and 18 in the form of a rectangle so as to form a cassette housing portion, and notches 18a are formed in the lower plate so as to correspond to the tape driving portion shown in FIGS. 1A to 1C. At the cassette insertion position, both the end portions of the lower plate 18 of the cassette holder 112 overlap the lower coupling plate 13, and only the intermediate portion of the lower plate 1 is separated from the lower coupling plate 13. A bent portion 19, for example, which is bent outward is formed at the distal end portion of the intermediate portion on the cassette loading/unloading side so as to ensure safety of a user (see FIG. 2). With this arrangement, even if, for example, the user inserts his/her hand into the cassette holder 112 in a state wherein a tape cassette 20 is not inserted, since the inserted hand is brought into contact with the bent portion 19 of the lower plate 18 of the cassette holder 112, injury such as a cut to the user caused by the lower plate 18 can be prevented. A lock piece (not shown) is formed on a deep end of the lower plate 18. When a cassette is inserted in the holder 112, the lock piece restricts the position of the cassette in the insertion direction and prevents further insertion.

Guide pins 19a and 19b are substantially axially arranged on the outer sides of the first and second side plates 15 and 16 of the cassette holder 112, respectively. These guide pins 19a and 19b are respectively inserted in substantially L-shaped guide holes 20a and 20b formed in the first and second support plates 10 and 11 so as to be freely guided. An engaging pin 21 is formed on the second side plate 16 so as to be substantially parallel to the guide pin 19b. The engaging pin 21 is inserted in a substantially L-shaped guide hole 22 formed in the second support plate 11 so as to be freely guided. With this arrangement, while the cassette holder 112 is clamped between the first and second support plates 10 and 11, it is slid on the guide 10a and moved, by the front loading mechanism 113 (to be described later), from the cassette insertion position in a substantially horizontal state (a direction indicated by an arrow B). The cassette holder 112 is then lowered in the vertical direction above the tape driving portion (see FIGS. 1A to 1C) so as to be guided to the cassette loading position, and is moved from the cassette loading position in the reverse direction (a direction indicated by an arrow A) to the cassette unloading position where the cassette can be removed.

A shaft 23 extends from the outer side of the second support plate 11. A first loading cam 24 constituting the front loading mechanism 113 is pivotally supported on the shaft 23. An arm portion 24a is formed on the first loading gear 24. An engaging hole 24b is formed in the arm portion 24a. The guide pin 19b of the second side plate 16 of the cassette holder 112 is inserted in the engaging hole 26b. A gear portion 24c is formed around the first loading gear 24. A transmission gear 25 is meshed with the gear portion 24c. The transmission gear 25 is fitted on one end of a shaft 26 rotatably arranged between the first and second support plates 10 and 11. A transmission gear 27 is fitted on the other end of the shaft 26. With this arrangement, upon rotation, the first loading gear 24 rotates the transmission gear 27 through the transmission gear 25 and the shaft 26.

A shaft 28 extends from the first support plate 10. A second loading gear 29 is rotatably supported on the shaft 28. A gear portion 29a is formed on the second loading gear 29. The transmission gear 27 is meshed with the gear portion 31a. In addition, an arm portion 29b is formed on the second loading gear 29. An engaging hole 29c is formed in the arm portion 29b. The guide pin 19a of the first side plate 15 of the cassette holder 112 is inserted in the engaging hole 29c. With this arrangement, these first and second loading gears 24 and 29 are synchronously rotated through the transmission gear 25, the shaft 26, and the transmission gear 27. Upon this rotation, the cassette holder 112 is driven through the guide pins 19a and 19b.

Figure 8:
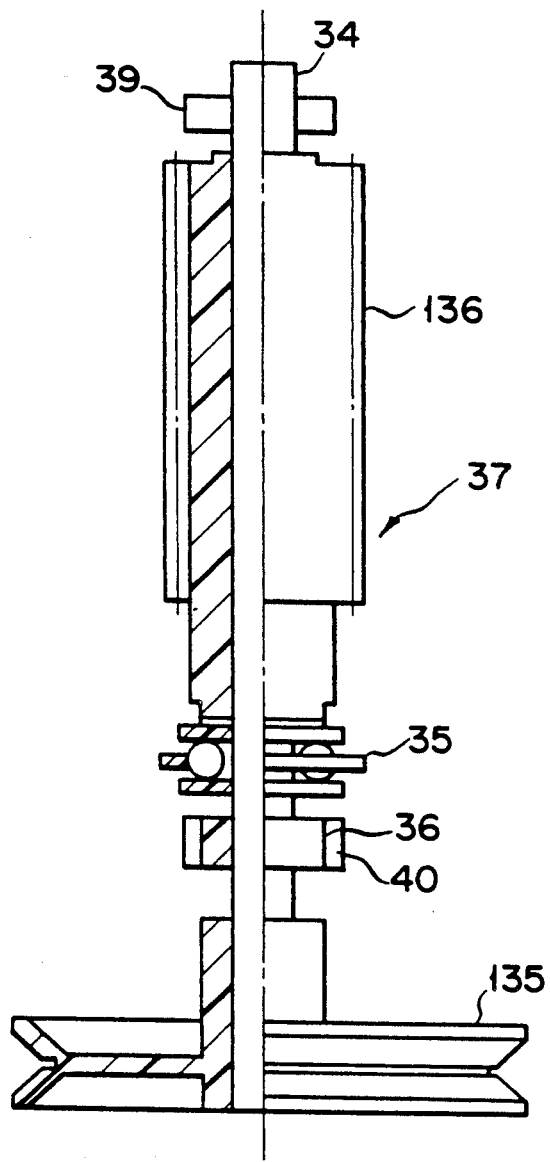
FIG. 8 is a sectional view showing a worm unit in FIG. 6 in detail.

A third loading gear 30 is arranged on the shaft 23 of the second support plate 11 in a stacked state with respect to the first loading gear 24. These first and third loading gears 24 and 30 are elastically engaged with each other through a spring 31. A gear portion 30a is formed around the third loading gear 30 so as to correspond to the gear portion 24c of the first loading gear 24. The worm 136 is meshed with the gear portion 30a. As shown in FIG. 8, the pulley 135 having a belt transmission mechanism formed on its one end is coaxially fitted on the worm 136 through a shaft 34. A worm unit 37, generally called a retainer assembly, which is assembled by integrally supporting a thrust bearing 35 and a radial bearing 36 is formed at the intermediate portion of the shaft 34. The worm unit 37 is mounted on a mounting member 38 mounted on the second support plate 11. First and second elastic support portions 39 and 40 are formed on the mounting member 38 so as to correspond to the other end of the shaft 34 and the radial bearing 36, respectively. The other end of the shaft 34 of the worm 136 and the radial bearing 36 of the worm unit 37 are respectively attached to the first and second elastic support portions 39 and 40 against their elastic forces. As described above, the rotational force of the capstan motor 127 is selectively transmitted to the pulley 135 through the transmission belt 134, and is then transmitted to the first and second loading gears 24 and 29 through the third loading gear 30.

Figure 10A:
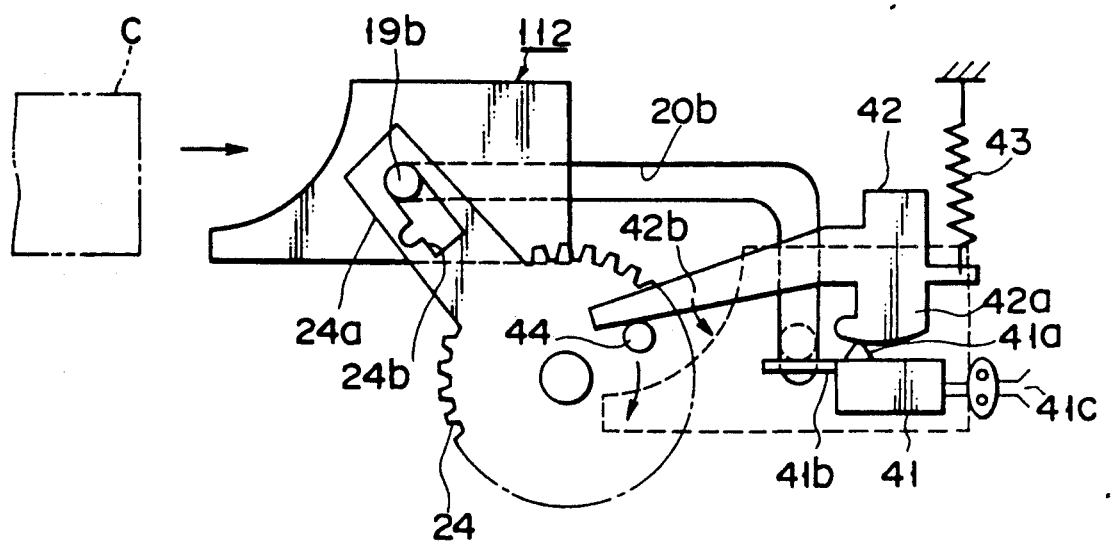
Figure 10B:
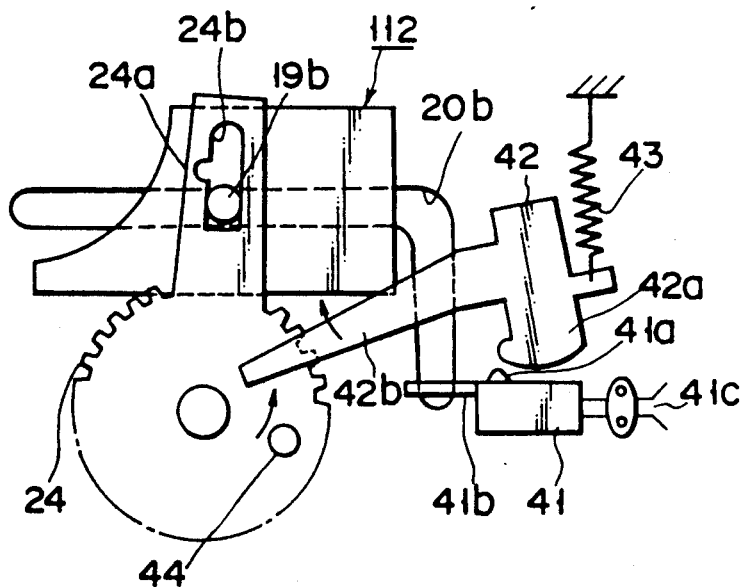

In order to detect the position of a cassette, a switch 41 including a pair of contacts 41c and first and second drive portions 41a and 41b for switching the ON/OFF states of the contacts 41c, and a switch operating member 42 are arranged on the mounting member 38 so as to correspond to each other (see FIGS. 10A and 10B). The switch operating member 42 has first and second engaging portions 42a and 42b, and is arranged such that a biasing force acts on the member 42 in the counter clockwise direction in FIGS. 10A and 10B through a spring 43. The first engaging portion 42a is opposed to the first drive portion 41a of the switch 41. A drive portion 44 formed on the first loading cam 24 is opposed to the second engaging portion 42b of the switch operating member 42. With this arrangement, when the engagement of the first loading gear 24 with the drive portion 44 is released at the cassette insertion position controlled by the cassette holder 112, the second engaging portion 42a is engaged with the first drive contacts 41c in an ON state, thus performing switching control. In addition, the second drive portion 41b of the switch 41 is arranged to correspond to the base portion of the guide hole 20b of the second support plate 11 so that when the cassette holder 112 reaches the tape driving portion, it is engaged with the guide pin 19b of the second side plate 16 so as to set the pair of contacts 41c in an OFF state, thus performing switching control. As shown in FIG. 9A, therefore, when the tape cassette C is inserted in the cassette holder 112, the holder 112 moves in the cassette insertion direction, while the first loading gear 24 is pivoted clockwise and the switch operating member 42 is pivoted counterclockwise. As a result, the second engaging portion 42b of the switch operating member 42 is disengaged from the drive portion 44, and the first drive portion 41a of the switch 41 is engaged with the first engaging portion 42b of the switch operating member 42, thus switching the pair of contacts 41c to an ON state, as shown in FIG. 10A. Subsequently, as shown in FIG. 9B, a driving force from the capstan motor 127 as a drive source is transmitted to the worm 136 and the third loading gear 30 through the transmission belt 134. As a result, the driving force is transmitted to the first and second loading gears 24 and 29 in the above-described manner, so as to load the cassette holder 112 (see FIG. 9C). When the cassette holder 112 reaches the tape driving portion as shown in FIG. 9D, the second drive portion 41b of the switch 41 is switched by the guide pin 19b of the cassette holder 112, and hence the pair of contacts 41c are turned off, as indicated by a dotted line in FIG. 10A. At this time, transmission of the driving force of the capstan motor 127 is stopped. When an ejecting operation is performed, and the capstan motor 127 is driven in the reverse direction, the worm 136, the third loading gear 30, and the first and second loading gears 24 and 29 are driven in the reverse direction. As a result, the cassette holder 112 is unloaded and moved to the cassette ejecting position where a user can remove the tape cassette. In this case, the switch operating member 42 is pivoted/biased clockwise by the drive portion 44 of the first loading gear 24 against the biasing force of the spring 43 as shown in FIG. 10B, and the first drive portion 41a of the switch 41 is finally disengaged from the first engaging portion 42b of the switch operating member 42 so as to switch the pair of contacts 42c to an OFF state, as shown in FIG. 10A. At this time, transmission of the driving force from the capstan motor 127 is stopped.

Figure 11:
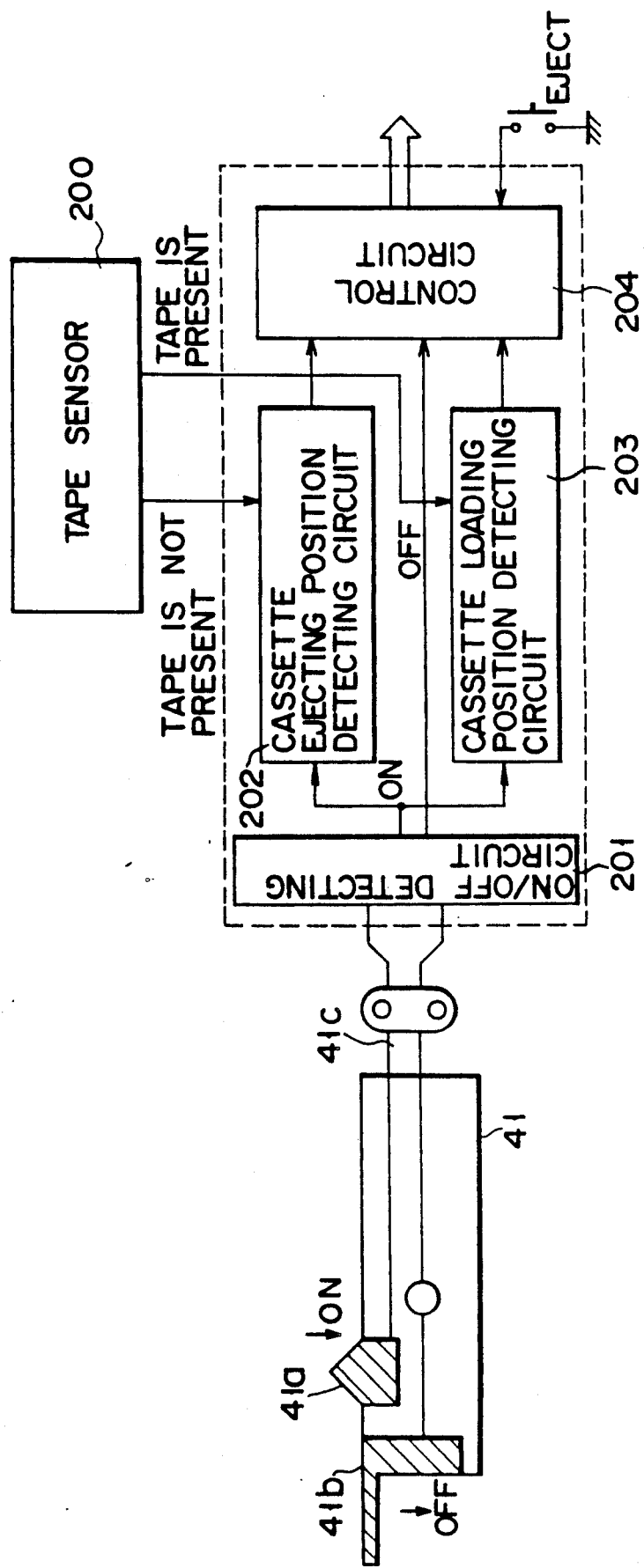
FIG. 11 is a block diagram showing a cassette position detecting circuit using a two-contact type switch.

In this case, if, for example, a pair of contacts 41c of a two-contact type are used as the switch 41, discrimination of the cassette loading and ejecting positions controlled by the cassette holder 112 is performed in such a manner that the cassette loading position is detected in a state wherein a tape is detected by a tape sensor 200, as shown in FIG. 11, and the cassette ejecting position is detected in a state wherein the tape is not detected by the tape sensor 200. More specifically, the ON/OFF state of the two-contact type contacts 41c of the switch 41 is detected by an ON/OFF detecting circuit 201. When an ON state is detected, the ON detection signal is compared with a tape absence or present signal from the tape sensor 200 in a cassette ejecting position detecting circuit 202 or a cassette loading position detecting circuit 203, and the comparison result is output to a control circuit 204.

The control circuit 204 is constituted by a system controller, such as a CPU, capable of performing a timer operation to be described later.

Figure 12:
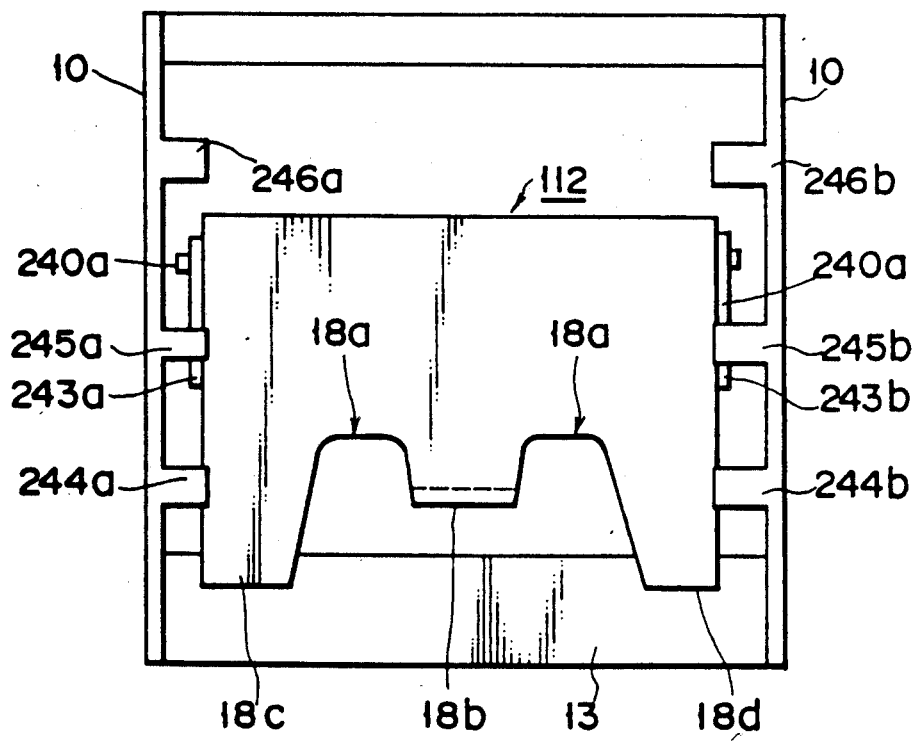
FIG. 12 is a view for explaining an operation of an error protection device in FIG. 6.

Cassette detecting members 240a and 240b for error protection are pivotally arranged on the first and second side plates 15 and 16. Biasing forces are exerted on the cassette detecting members 240a and 240b clockwise through springs 21a and 21b, as shown in FIGS. 7A and 7B. A driven portion 242b (FIGS. 6, 7A and 7B show only the cassette detecting portion 240b of the second side plate 16 in detail) is formed on one end of each of the cassette detecting members 240a and 240b so as to correspond to the leading edge of the tape cassette C. Each of lock portions 243a and 243b is formed on the other end of a corresponding one of the cassette detecting members 240a and 240b. These lock portions 243a and 243b are arranged to respectively correspond to lock portions formed on the first and second support plates 10 and 11, e.g., two sets of first to third bent portions 244a, 245a, and 246a, and 244b, 245b, and 246b (see FIG. 6). These first to third bent portions 244a, 245a, and 246a, and 244b, 245b, and 246b are respectively formed on the first and second support plates 10 and 11 at predetermined intervals between the cassette loading position and the tape driving portion, as shown in FIG. 12. With this arrangement, when the tape cassette C is inserted in the cassette holder 112, the lock portions 243a and 243b of the cassette detecting members 240a and 240b are separated from the first to third bent portions 244a, 245a, and 246a and 244b, 245b, and 246b, thus allowing the cassette holder 112 to be moved. If the tape cassette C is not inserted in the cassette holder 112, the cassette detecting members 240a and 240b are pivoted clockwise by the biasing forces of the springs 21a and 21b. As a result, the lock portions 243a and 243b are respectively locked by the first bent portions 244a and 244b so as to stop movement of the cassette holder 112. In addition, if the tape cassette C is removed from the cassette holder 112 by a user during loading of the cassette C, the cassette detecting members 240a and 240b are pivoted clockwise by the biasing forces of the springs 21a and 21b upon removal of the cassette C, and each of the lock portions 243a and 243b is opposed to and locked by a corresponding one of the first to third bent portions 244a, 245a, and 246a, and 244b, 245b, and 246b (see FIG. 12). That the switch 41 is not switched from an ON state to an OFF state within a predetermined period of time means that the cassette is not properly loaded. Therefore, in this case, this abnormal state is detected by a timer operation of the control circuit 204, and the capstan motor 127 is driven in the reverse direction by an abnormality detection output signal from the control circuit 204 so as to reverse cassette loading. As a result, the cassette holder 112 is restored to the cassette ejecting position.

As described above, the cassette loading apparatus is designed such that the first to third bent portions 244a, 245a, and 246a, and 244b, 245b, and 246b are arranged on the first and second support plates 10 and 11, which constitute the moving path of the cassette holder 112, at the predetermined intervals, and the presence/absence of an operation of the cassette detecting members 240a and 240b of the cassette holder 112 are detected at a plurality of positions between the tape insertion position to the position where tape loading is completed. According to this arrangement, if the tape cassette C is not inserted at the cassette insertion position, the cassette detecting members 240a and 240b are locked by the first bent portions 244a and 244b so as to inhibit loading of the cassette holder 112. If the tape cassette C is removed from the cassette holder 112 after the tape cassette C is inserted and a loading operation is started, the lock portions 243a and 243b of the cassette detecting members 240a and 240b are selectively locked, during the loading operation, by the second and third bent portions 245a and 245b, and 246a and 246b which are located nearest to the lock portions 243a and 243b in accordance with the timing of removal. Upon this lock operation, the front loading mechanism is controlled to be driven in the reverse direction by the control circuit 204 so as to forcibly restore the cassette holder 112 to the cassette ejecting position. With this arrangement, since the cassette holder 112 is capable of quick detection in accordance with the timing of removal of the tape cassette C even during a loading operation quick, reliable operation control of the cassette holder 112 can be realized, and operability can be optimized. In this case, the positions of the bent portions 245a and 245b are set to allow both protrusions 18c and 18d of the lower plate 18 of the cassette holder 112 to two dimensionally overlap the lower coupling plate 13, or not to allow a finger of a user to be inserted in a gap defined between the lower plate 18 and the lower coupling plate 13. In addition, the positions of the bent portions 245a and 245b are set to allow a cassette end portion to slightly protrude from the front surface of the cabinet by such an extent that the user cannot hold the cassette with his/her hand, or to stop the cassette at a position where the cassette end is located slightly inward from the front surface of the cabinet. With this arrangement, if the user intentionally removes a cassette after the cassette is inserted and the loading mechanism is started, the cassette detecting members 243a and 243b are locked by the bent portions 245a and 245b, and the cassette holder 112 is stopped. Therefore, even if the user accidentally inserts his/her finger into the cassette holder 112, the finger cannot be inserted into a portion between the protrusions 18c and 18d of the lower plate 18 and the lower coupling plate 13. Even if the cassette holder 112 is moved in the reverse direction to the third position which the finger is inserted, since a sufficient space is defined between the notches 18a and 18b and the lower coupling plate 13, no problem is posed. In addition, the driving mechanism of the cassette holder 112 is designed such that the cassette holder 112 and the driving means are coupled to each other through the first and third loading cams 24 and 30 and the spring 31 with an elastic force. With arrangement, even if a finger of a user or the like is clamped between the bent portion 18b and the lower coupling plate 13, since the width of the space defined therebetween is set to allow only the biasing force of the spring 31, the user is free from injury.

In the above-described embodiment, the first to third bent portions 244a, 245a, and 246a, and 244b, 245b, and 245b are formed, as lock portions, on the first and second support plates 10 and 11 which oppose each other on the moving path. However, the number of bent portions of each support plate is not limited to three. In order to detect the presence/absence of the tape cassette C at smaller intervals, more than three bent portions may be arranged on the moving path.

Figure 13:
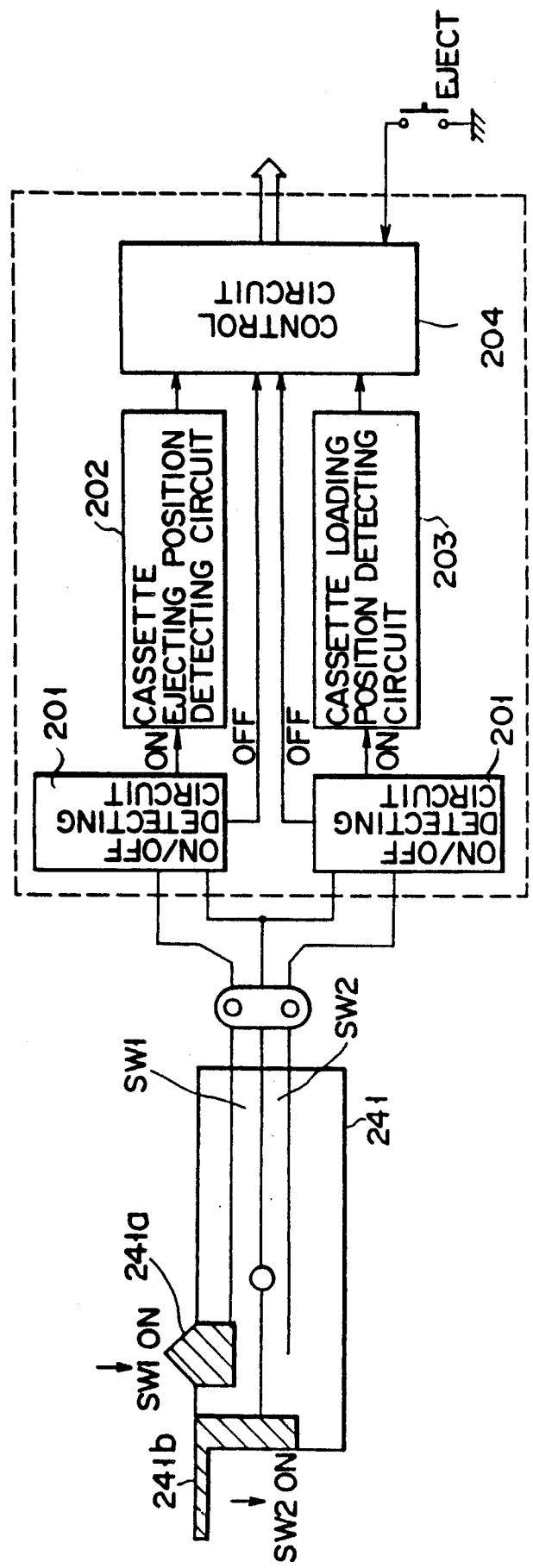
FIG. 13 is a block diagram showing a cassette position detecting circuit using a three-contact type switch.

Furthermore, in the above embodiment, a two-contact type switch is used. However, the present invention is not limited to this. For example, a switch 241 shown in FIG. 13 having two three-contact type switches SW1 and SW may be used. In this case, the position controlled by the cassette holder 121 can be directly discriminated from the switching state of the switch 241 without discriminating the switching state of the switch 24 by using the above-described tape end detector. FIG. 14 is a flow chart showing an operation of this case.

The present invention is not limited to the above-described embodiment. Various changes and modifications ca be made within the spring and scope of the invention.

As has been described above, according to the present invention, there is provided a cassette loading apparatus in which reliable, quick operation control of the cassette holder can be performed, and an operation error of a user is prevented, thereby improving operability and ensuring safety of the user.

What is claimed is:
1. A cassette loading apparatus comprising:
 a cassette holder which houses a cassette to be loaded and is arranged to be movable along a substantially horizontal moving path;
 cassette detecting means which is arranged on said cassette holder and is set at an operative position and a nonoperative position in accordance with the presence/absence of the cassette;
 loading means for selectively driving said cassette holder so as to load the cassette from an insertion position to a driving position and to unload the cassette from the driving position to an ejecting position;
 a plurality of lock means, arranged on the moving path of said cassette holder at predetermined intervals, for locking said cassette detecting means by using one of said lock means when said cassette detecting means is set at the nonoperative position; and control means for allowing said loading means to perform loading in response to insertion of the cassette, allowing said loading means to perform unloading in response to an ejecting operation, and switching a loading operation of said loading means to an unloading operation when one of said plurality of lock means locks said cassette detecting means during execution of loading by said loading means.

2. An apparatus according to claim 1, wherein said control means comprises switch means which responds to insertion of the cassette and arrival of the cassette at the driving position, and means for switching said loading means from a loading operation to an unloading operation when an abnormal state is detected by a timer operation based on a response of said switch means.

3. An apparatus according to claim 1, wherein said plurality of lock means are arranged at not less than three positions on the moving path.

* * * * *